(12) United States Patent
Stefanis et al.

(10) Patent No.: US 9,234,434 B2
(45) Date of Patent: Jan. 12, 2016

(54) LABYRINTH SEAL FOR TURBINES

(71) Applicant: ALSTOM Technology Ltd, Baden (CH)

(72) Inventors: Vasileios Stefanis, Niederrohrdorf (CH); Christos Georgakis, Leicester (GB)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/490,022

(22) Filed: Sep. 18, 2014

(65) Prior Publication Data
US 2015/0001812 A1    Jan. 1, 2015

Related U.S. Application Data

(63) Continuation of application No. PCT/EP2013/055877, filed on Mar. 21, 2013.

(30) Foreign Application Priority Data

Mar. 21, 2012   (EP) .................... 12160516

(51) Int. Cl.
F01D 11/02   (2006.01)
F16J 15/44   (2006.01)

(52) U.S. Cl.
CPC ............. F01D 11/02 (2013.01); F16J 15/44 (2013.01); *F05B 2220/301* (2013.01); *F05B 2240/571* (2013.01)

(58) Field of Classification Search
CPC .................................................. F16J 15/4472
See application file for complete search history.

(56) References Cited

U.S. PATENT DOCUMENTS

| 4,420,161 | A |   | 12/1983 | Miller |   |
|---|---|---|---|---|---|
| 4,976,444 | A | * | 12/1990 | Richards | F16J 15/443 277/412 |
| 5,161,943 | A | * | 11/1992 | Maier | F01D 11/02 277/412 |
| 5,190,440 | A | * | 3/1993 | Maier | F01D 11/02 277/412 |
| 5,362,072 | A | * | 11/1994 | Dalton | F16J 15/441 277/413 |
| 5,403,019 | A | * | 4/1995 | Marshall | F16J 15/441 277/413 |
| 5,639,095 | A | * | 6/1997 | Rhode | F16J 15/4472 277/303 |
| 5,735,667 | A |   | 4/1998 | Sanders et al. |   |
| 5,890,873 | A |   | 4/1999 | Willey |   |
| 6,045,134 | A | * | 4/2000 | Turnquist | F16J 15/3288 277/347 |
| 6,131,910 | A |   | 10/2000 | Bagepalli et al. |   |

(Continued)

FOREIGN PATENT DOCUMENTS

| CN | 2913750 Y | 6/2007 |
|---|---|---|
| CN | 102322529 A | 1/2012 |

(Continued)

OTHER PUBLICATIONS

Office action issued from Chinese Patent Office dated May 5, 2015 for CN Application No. 201380015480.2.

*Primary Examiner* — Vishal Patel
*Assistant Examiner* — L. Susmitha Koneru

(57) ABSTRACT

An improved labyrinth seal is described with the seal including a group of several fins forming circumferential barriers against the flow of a working fluid between stationary and rotating parts in a turbine, wherein within the group the volume between the penultimate fin and the last fin is altered compared to the average volume between other adjacent fins of the group.

4 Claims, 4 Drawing Sheets

(56) References Cited

U.S. PATENT DOCUMENTS

| | | | |
|---|---|---|---|
| 8,133,014 B1* | 3/2012 | Ebert | F01D 11/025 415/173.3 |
| 8,434,766 B2* | 5/2013 | Zeng et al. | 277/419 |
| 2002/0190474 A1* | 12/2002 | Turnquist | F16J 15/442 277/355 |
| 2004/0096319 A1 | 5/2004 | Uchida et al. | |
| 2009/0160135 A1* | 6/2009 | Turini | F01D 11/02 277/418 |
| 2011/0068540 A1* | 3/2011 | Colson | F01D 11/02 277/419 |
| 2012/0043728 A1* | 2/2012 | Zeng | F01D 11/001 277/412 |
| 2012/0091662 A1* | 4/2012 | Neeli | F01D 11/02 277/420 |
| 2012/0126489 A1* | 5/2012 | Picatto | F16C 23/084 277/562 |

FOREIGN PATENT DOCUMENTS

| | | |
|---|---|---|
| EP | 2 182 173 A2 | 5/2010 |
| JP | 2005180278 A | 7/2005 |
| JP | 2009085256 A | 4/2009 |

* cited by examiner

LABYRINTH SEAL FOR TURBINES

CROSS-REFERENCE TO RELATED APPLICATIONS

This application claims priority to PCT/EP2013/055877 filed Mar. 21, 2013, which claims priority to European application 12160516.6 filed Mar. 21, 2012, both of which are hereby incorporated in their entireties.

TECHNICAL FIELD

The present invention relates to a seal mounted between rotating and static parts of a turbine, particularly between the rotor shaft of a stationary steam turbine and static casing or extensions thereof.

BACKGROUND

In the following description the term "turbine" is used to refer to rotary engines having a stator and a rotating part force coupled by a fluid medium such as water or gas. Of particular interest for the present invention are axial turbines comprising radially arranged fixed stator blades or vanes alternating with radially arrangements of moving rotor blades. Movements are generally registered as movements relative to a casing or housing.

A common problem encountered in the design and operation of turbines is the leakage between the rotor shaft of a stationary steam turbine and static casing or extensions thereof.

To reduce leakage it is known to close the gap between the rotating parts and the static parts by appropriate seals. The sealing devices used in turbines are known as steam seals, gland seals, labyrinth seals, steam packing, diaphragm packing, and pressure packing. The fundamental component of these seals is the sealing ring. The sealing ring is a ring shaped structure which is typically provided as arcuate sealing ring segments. The sealing ring encircles the rotating member and bridges or blocks at least partly the gap between the rotating part and the surrounding stationary part.

The most common type of seal used for this purpose is the labyrinth seal. A labyrinth seal has typically a number of radially extending annular knifes, fins or teeth on one part and a corresponding annular seal land on the other part or an arrangement of threats or grooves. More complex seals include radially extending, interlocking annular knifes, fins or teeth on both sides of the gap. All variants have the common feature of providing a tortuous path for the fluid through the gap. As a complete ring, a labyrinth seal is usually assembled as halves, quarter or smaller segments within and supported by the casing.

As labyrinth seals are well known, it suffices for the purpose of the present invention to emphasize that such seals are complex shapes requiring exacting dimension tolerances to function properly. Any movement of the parts of the seal from their default positions or wear during operation generates usually a significantly increase of leakage or friction between the moving and the static part.

To accommodate relative movement of the parts of the seal in case of a radial expansion or shrinkage of the blade, some seals are assembled as spring-backed packages. In a spring-backed seal, the elastic force pushes one part of the seal against the other and thus avoids widening gaps or excessive friction when the moving blades shrink or expand.

Labyrinth-type seals are described in a large body of published literature, exemplarily represented by the U.S. Pat. Nos. 4,420,161, 5,735,667, or 6,131,910, respectively, all of which can be used to derive further background knowledge for the present invention.

While improving the performance of labyrinth seals is a perpetual task, the current invention addresses further problems specifically associated with the retrofitting of existing stationary turbines, particularly steam turbines.

SUMMARY

According to an aspect of the present invention, there is provided a seal for a turbine including am axial series of several fins forming circumferential barriers against the flow of a working fluid between stationary and rotating parts in a turbine, wherein within the series the volume between the penultimate fin and the last fin is largest compared to the average volume between adjacent fins of the series.

A series of fins is understood as an uninterrupted sequence of adjacent fins forming one side of a labyrinth seal. Typically the fins of a series are identical or at least very similar in shape and size. The volume is the volume as measured up to a straight line or plane connecting the tips of adjacent fins.

In a preferred variant of the invention a volume increasing groove is provided in the stationary part between the penultimate fin and the final fin. As a result of the groove, the volume between the penultimate fin and the final fin is greater than the volume between any two adjacent fins.

In a preferred further variant of the invention all fins but the last of a series of fins are slanted against the direction of flow of the working fluid across the seal. In this variant the last fin is preferably straight. In a more preferred embodiment of this variant, all fins have essentially the same height. The height is measured in radial direction from a straight base line parallel to the axis of the turbine representing the surface of the base on which the fins of the series are mounted to the respective tip of the fin. In case the land on the other side of a gap between the stationary and rotating parts is an essentially flat surface, the distance between the tips of the fins of a series to such a land is essentially equal.

The fins of a series are typically machined from a single strip of material. But it is also possible to fix each fin or fin segment individually to a base block or carrier and mounted individually in a process referred to as "caulking" The fins are typically manufactured from metal, such as steel alloys.

These and further aspects of the invention will be apparent from the following detailed description and drawings as listed below.

BRIEF DESCRIPTION OF THE DRAWINGS

Exemplary embodiments of the invention will now be described, with reference to the accompanying drawings, in which.

DETAILED DESCRIPTION

The labyrinth seals as described above can advantageously be used as gland seals, which seal the rotor shaft from the casing. The gland seals are found between different axial turbine blocks, between turbines and generators and more generally near bearings.

Figure 1:
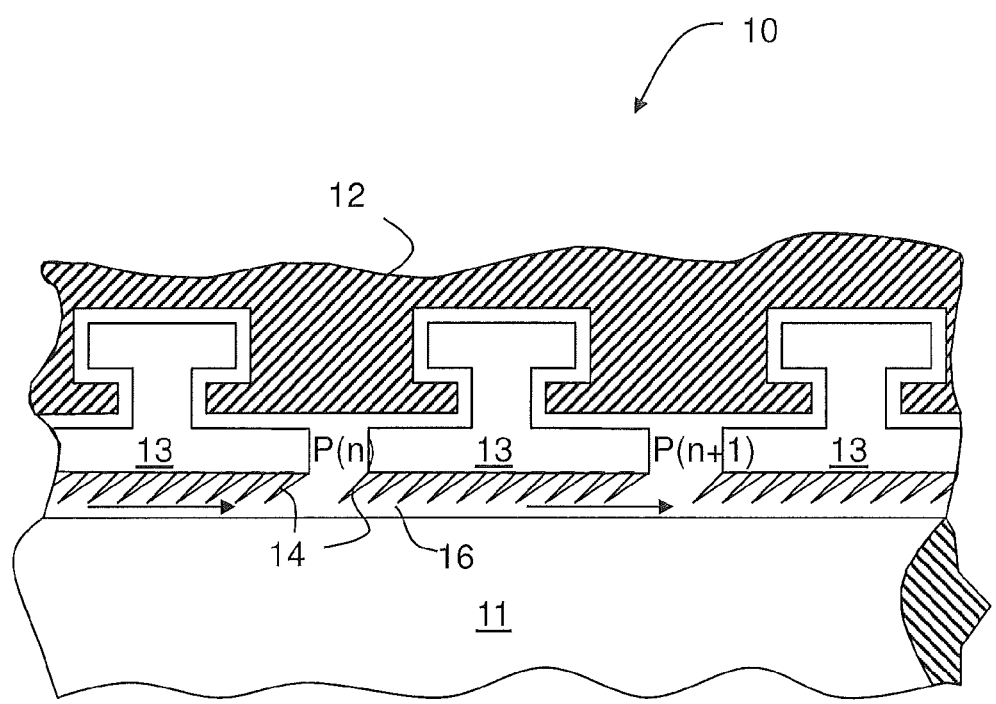
FIG. 1 presents a schematic cross-section of the rotor/stator section of a (known) steam turbine to illustrate an environment in which the present invention could be applied.

The schematic partial axial cross-section of FIG. 1 shows a known gland seal system 10 between a rotor shaft 11 and a casing 12. The system includes an axial series of circumferential labyrinth seals 13 reducing the flow of pressurized steam in the direction of the arrow, i.e., from the left to the right of drawing. Each of labyrinth seals 13 carries 10 circumferential fins 14 slanted against the direction of the flow. The shown seal has a fixed pressure differential between adjacent seals denoted as P(n) and P(n+1). Labyrinth seals with fixed pressure differentials across gland seals are found in many steam turbine plants set by maintaining constant pressures on both sides of the seal in normal operation. The seals 13 can be connected to the casing with a spring package (not shown) to reduce friction, if for example the rotor is rotating outside its default position or the casing is deformed by heat or mechanical load.

Typically the rotor side of the seal would carry a similar number of fins interleafed with the fins 14 on the casing or some other surface structure to provide a true tortuous path for the steam. Whilst it is recognized that such interleaved seal designs may increase the efficiency of a seal for a given length of seal, it is often not desirable or not even possible to change the surface of the rotor, particularly when the seals are installed as a retrofit into existing steam turbines.

Figure 2A:
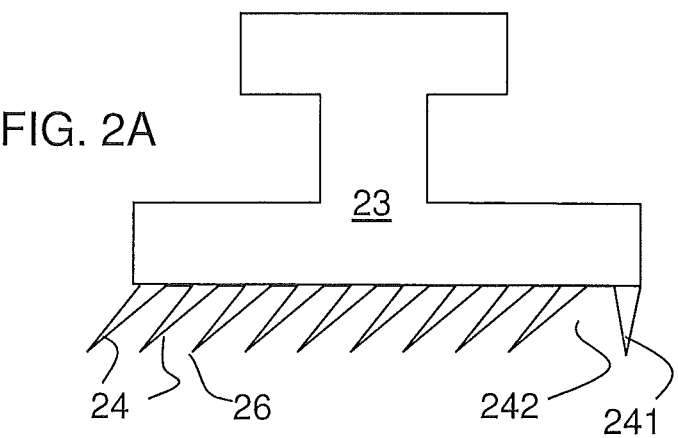
FIG. 2A illustrates an embodiment of the invention.

For the following description and efficiency calculations it is assumed that the rotor side of the seal is a smooth surface. In the example of FIG. 2A, the seal 23 carries again a total of 10 fins 24. The first nine fins 24 are practically identical to the first nine fins 14 of the seals 13 of FIG. 1. However the last fin 241 of the seal 24 is a straight fin.

Figure 2B:
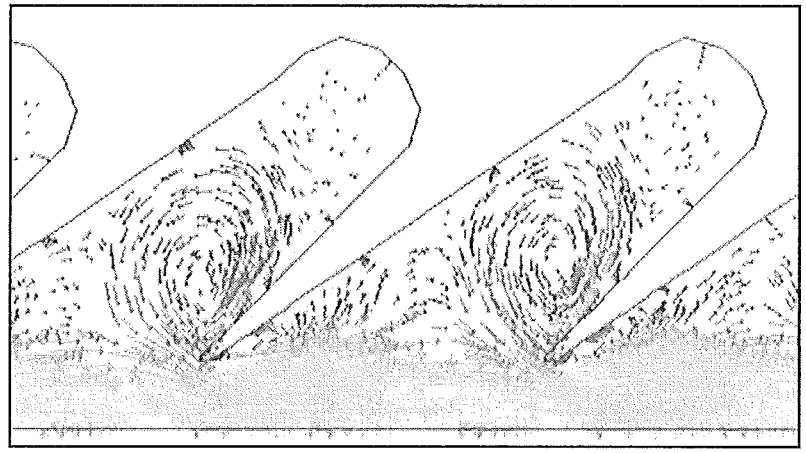
FIGS. 2B and 2C show plots of results gained through numerical simulations on a prior art seal compared to a seal modified in accordance with an example of the invention.
Figure 2C:
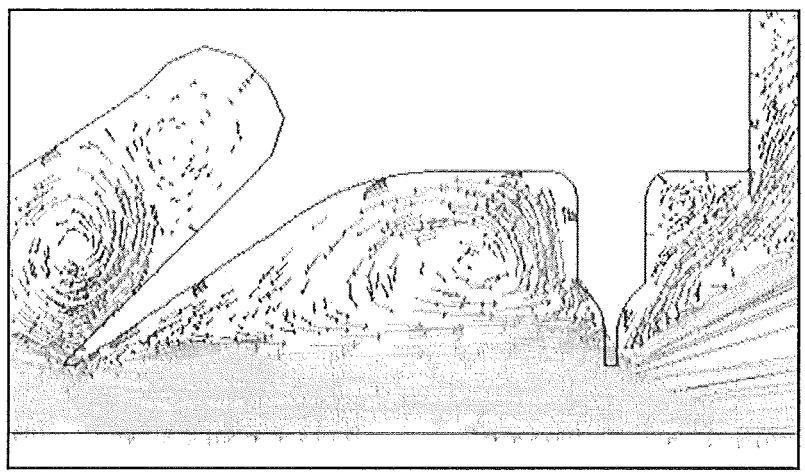

Though the change of the last fin and the resulting change in the geometry of the space 242 between the penultimate fin and the last fin 241 may be regarded as minor, a higher efficiency has be surprisingly found as a result of such changes. The effect of the design change can be modelled using standard flow modelling methods as illustrated in FIGS. 2B and 2C. The plots depict the vertices forming with the space between adjacent fins in the case of fins slanted against the direction of the steam flow (FIG. 2B) and in the case of the last fin being straight (FIG. 2C). Whilst still forming a vortex, the pattern looks significantly different from the pattern between slanted fins due to the changed geometry of the fin and the space before the last fin.

Figure 2D:
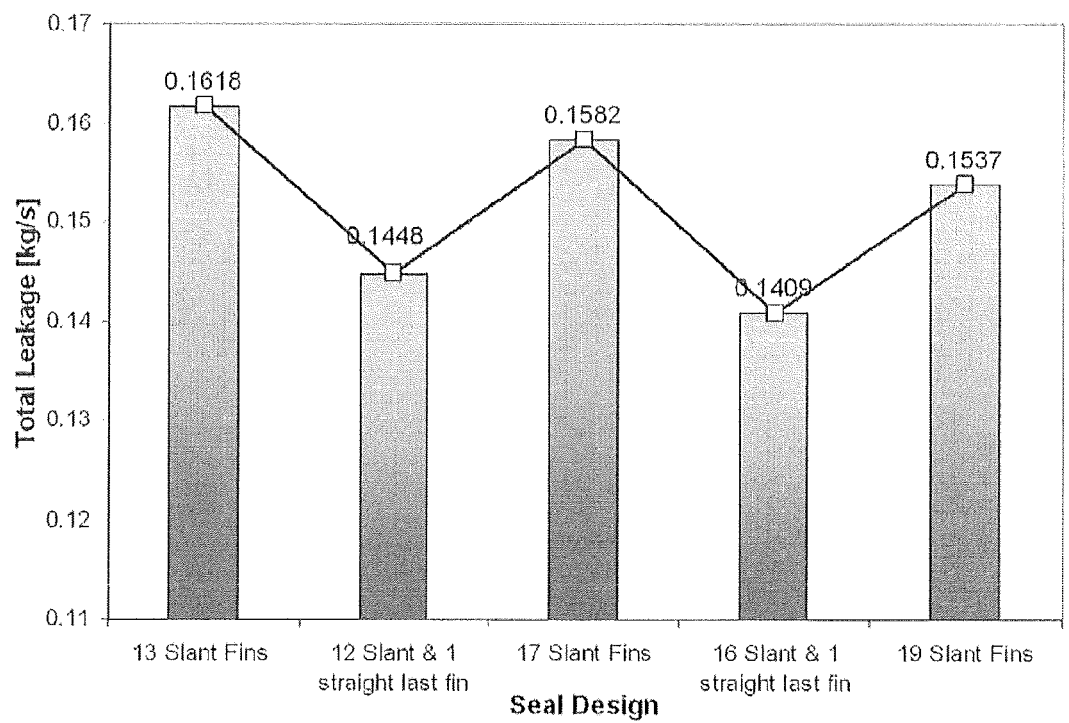
FIG. 2D is a chart comparing the leak flow through conventional labyrinth seals and labyrinth seals modified in accordance with further examples of the invention.

In FIG. 2D, the results of simulations runs using constant pressure drops across a seal are summarized as bar chart. The chart compares (from the left to the right) the leaked flow along a labyrinth seal with 13 slanted fins, a labyrinth seal with 12 slanted fins and a last straight fin, a labyrinth seal with 17 slanted fins, a labyrinth seal with 16 slanted fins and a last straight fin design and a labyrinth seal with 19 slanted fins.

Comparing first the labyrinth seal with 13 slanted fins with the labyrinth seal with 12 slanted fins and a last straight fin, the leaked flow drops from 0.1618 kg/s steam to 0.1448 kg/s, i.e., by about 10%. When comparing the labyrinth seal with 17 slanted fins with the labyrinth seal with 16 slanted fins and a last straight fin, the leaked flow drops from 0.1582 kg/s steam to 0.1409 kg/s, i.e., again by about 10%. Both modified labyrinth seal show better performance than the labyrinth seal with 19 slanted fins (0.1537 kg/s).

The results indicate that the change of geometry at and around the position of the last fin can have a significant gain in the overall performance of a labyrinth seal even without changing the total number of fins of the seal. An alternative is illustrated in FIG. 3.

Figure 3:
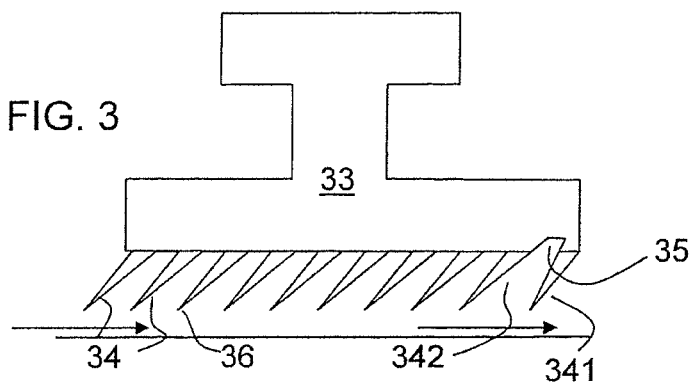
FIG. 3 shows a possible labyrinth seal in accordance with the present invention.

In FIG. 3, the labyrinth seal 33 carries fins 34 slanted against the flow direction. In this example all fins are mounted equidistant. To change the geometry of the space between the penultimate fin and the last fin 341, the space 342 between these two fins has groove extending in to the labyrinth seal 33 such that the space between the penultimate fin and the last fin 341 is deeper that the space between any other two adjacent fins 34 and as a result, the volume between the penultimate in and the last fin 341 is greater than the volume between any other two adjacent fins 34. Within this specification "penultimate" and "last" are relative positions that are understood based on the direction of flow of the working fluid across the seal. That is, the last fin 341, is the fin 34 that is the furthest downstream fin 34, while the penultimate fin is a fin 34 that is immediately upstream of the last fin 341.

Figure 4:
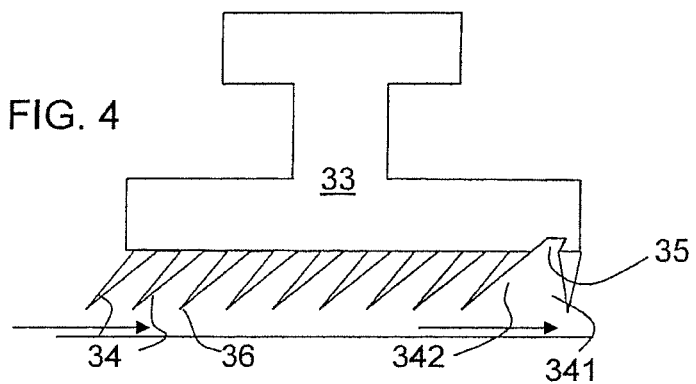
FIG. 4 shows a labyrinth seal wherein all fins but the last of the series of fins are slanted against the direction of flow of the working fluid across the seal and the last fin is essentially straight.

It appears further possible to combine the effects of using a differently slanted last fin with the other proposed changes of the geometry of the space between the two last fins of the seal. It is also possible that further refinement of the geometry of the space between the two last fins of the seal, for example a pattern of additional grooves, or changes in the shape of the last fin, may enhance the observed effect. For example, FIG. 4 shows a labyrinth seal wherein all fins but the last of the series of fins are slanted against the direction of flow of the working fluid across the seal and the last fin is essentially straight.

The seals can also be combined with different types of seals such as brush seals in a manner known per se. In case of a brush seal mounted with an axial series of fins, the fins on either side of the brush seal could be regarded as forming new series of the fins within the scope of the present invention. Even in cases where the fins or inter-fin spaces are varied according to a regular and/or repetitive pattern across the fins of the seal, the shape or geometry of the space between the last two fins is expected to deviate from any of the shapes or geometry of the spaces between two fins at other parts of the seal. The changes of the shape or geometry of the space between the last two fins is also expected to exceed normal variations in manufacturing tolerances in an unambiguous manner.

The invention may comprise any individual features described or implicit herein or shown or implicit in the drawings or any combination of any such features or any generalisation of any such features or combination, which extends to equivalents thereof. Thus, the breadth and scope of the present invention should not be limited by any of the above-described exemplary embodiments. Alternative features serving the same, equivalent or similar purposes may replace each feature disclosed in the specification, including the drawings, unless expressly stated otherwise.

Unless explicitly stated herein, any discussion of the prior art throughout the specification is not an admission that such prior art is widely known or forms part of the common general knowledge in the field.

The invention claimed is:

1. A labyrinth seal arrangement for an axial flow turbine comprising:
    a stationary part and a rotating part;
    an axial series of fins, including at least a first, second, third and fourth fin, the fins being distributed equidistantly along points of the stationary part and each extending from the stationary part towards the rotating part to a tip so as to form a circumferential barrier against a flow of a working fluid between the stationary part and the rotating part, and
    a groove in the stationary part located between a penultimate fin that is the second fin and a last fin that is the first fin wherein, as a result of the groove, a volume between the penultimate fin and the last fin is greater than a volume of any other two adjacent fins of the series including a volume between the third fin adjacent the second fin and a volume between the fourth fin adjacent the third fin wherein all fins of the series have essentially the same length, and the volume between the second fin and the third fin and the volume between the fourth fin and the third fin are equal, wherein the distance between each of the tips of the series of fins and the rotating part are essentially equal.

2. The arrangement of claim 1 wherein all fins but the last fin of the series of fins are slanted against the direction of flow of the working fluid across the seal.

3. The arrangement of claim 1 wherein all fins but the last of the series of fins are slanted against the direction of flow of the working fluid across the seal and the last fin is essentially straight.

4. The arrangement of claim 1 being part of a gland seal between a casing and a rotor shaft in a steam turbine.

* * * * *